(12) United States Patent
Park et al.

(10) Patent No.: US 7,756,001 B2
(45) Date of Patent: Jul. 13, 2010

(54) APPARATUS AND METHOD OF DECIDING RECEIVED SYMBOL IN M-PSK SYSTEM

(75) Inventors: Jin A Park, Daejeon (KR); Seung Keun Park, Daejeon (KR); Pyung Dong Cho, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 11/607,539

(22) Filed: Nov. 30, 2006

(65) Prior Publication Data

US 2007/0127601 A1    Jun. 7, 2007

(30) Foreign Application Priority Data

Dec. 2, 2005    (KR) .................. 10-2005-0116871

(51) Int. Cl.
*H04J 11/00* (2006.01)

(52) U.S. Cl. ............... 370/206; 370/207; 370/210; 370/215; 370/483; 375/329; 375/356; 375/302; 375/295

(58) Field of Classification Search ......... 370/203–215, 370/333, 483, 330, 310; 375/329, 268, 269, 375/267, 316, 260, 346, 345, 298, 226, 295, 375/241, 227, 286
See application file for complete search history.

(56) References Cited

U.S. PATENT DOCUMENTS

| | | | |
|---|---|---|---|
| 5,581,582 A * | 12/1996 | Choi | ............... 375/344 |
| 5,684,836 A * | 11/1997 | Nagayasu et al. | ........... 375/326 |
| 5,862,187 A | 1/1999 | Dwarakanath et al. | |
| 6,421,399 B1 | 7/2002 | Avidor et al. | |
| 6,522,703 B1 * | 2/2003 | Cueff et al. | ............... 375/329 |
| 6,633,616 B2 * | 10/2003 | Crawford | ............... 375/326 |
| 6,650,715 B1 * | 11/2003 | Kim et al. | ............... 375/344 |
| 6,795,512 B1 | 9/2004 | Eidson et al. | |

(Continued)

FOREIGN PATENT DOCUMENTS

KR    1020000017092    3/2000

(Continued)

OTHER PUBLICATIONS

NPL document "SEP Performance of Coherent MPSK Over Fading Channels in the Presence of Phase/Quadrature Error and I-Q Gain Mismatch" to Park et al. (hereinafter Park) published Jul. 2005. See Whole Document.*

(Continued)

*Primary Examiner*—Hong Cho
*Assistant Examiner*—Yosief Berhane
(74) *Attorney, Agent, or Firm*—Ladas & Parry LLP

(57) ABSTRACT

An apparatus for and method of deciding symbols in a M-ary phase shift keying (MPSK) system are provided. The apparatus includes: a linear transform unit performing linear transform, to which a phase error is applied, of a received pair of symbols; and a symbol decision unit deciding a transmitted symbol corresponding to the received pair of symbols according to the sign value of the transformed symbol pair. According to the apparatus and method, degradation of a symbol error rate caused by a phase error when an MPSK signal is demodulated can be improved and a phase error can be estimated through a simple method.

8 Claims, 3 Drawing Sheets

U.S. PATENT DOCUMENTS

| | | | |
|---|---|---|---|
| 2003/0016767 A1 | 1/2003 | Houtman | |
| 2004/0081258 A1* | 4/2004 | Li et al. | 375/329 |
| 2004/0141457 A1* | 7/2004 | Seo et al. | 370/203 |
| 2007/0211831 A1* | 9/2007 | Wilhelmsson | 375/329 |

FOREIGN PATENT DOCUMENTS

| | | |
|---|---|---|
| KR | 1020050107106 | 11/2005 |

OTHER PUBLICATIONS

NPL document "SEP Performance of Coherent MPSK Over Fading Channels in the Presence of Phase/Quadrature Error and I-Q Gain Mismatch" to Park et al. published Jul. 2005.*

NPL document "An Alternate Approach to the symbol Error Probability of Coherent M-PSK Having a Phase Error in an AWGN channel" to Park.*

Park, S., et al., "An Alternative Approach to the Symbol Error Probability of Coherent $M$-PSK Systems Having a Phase Error in an AWGN Channel." Dec. 2004. *IEICE Trans. Commun.* vol. E87-B, No. 12, pp. 3784-3786.

Simon, M., et al., "Some New Twists to Problems Involving the Gaussian Probability Integral." Feb. 1998. *IEEE Transactions on Communications*, vol. 46, No. 2, pp. 200-210.

* cited by examiner

APPARATUS AND METHOD OF DECIDING RECEIVED SYMBOL IN M-PSK SYSTEM

CROSS-REFERENCE TO RELATED PATENT APPLICATIONS

This application claims the benefit of Korean Patent Application No. 10-2005-0116871, filed on Dec. 2, 2005, in the Korean Intellectual Property Office, the disclosure of which is incorporated herein in its entirety by reference.

BACKGROUND OF THE INVENTION

1. Field of the Invention

The present invention relates to a M-ary phase shift keying (hereinafter referred to as M-PSK), and more particularly, to an apparatus and method of improving degradation of a symbol error rate caused by a phase error and estimation of a phase error when an M-PSK signal is demodulated.

2. Description of the Related Art

Generally, an M-PSK system is broken down into a quadrature phase shift keying system, an 8-PKSK system and a 16-PSK system with respect to a modulation level M value. In most of wireless communication systems, the QPSK is used, but in a recently announced enhanced data for global evolution (EDGE) standard specification, the 8-PSK is employed in order to achieve a high transmission speed. Meanwhile, all M-PSK systems have phase errors occurring in a phase-locked loop and the bigger the phase error is, the higher the symbol error probability of the M-PSK system becomes.

SUMMARY OF THE INVENTION

The present invention provides an apparatus for and method of estimating a phase error in an M-PSK system having a phase error and improving degradation of a symbol error rate caused by a phase error.

According to an aspect of the present invention, there is provided a symbol decision apparatus of a M-ary phase shift keying (M-PSK) system, the apparatus including: a linear transform unit performing linear transform, to which a phase error is applied, of a received pair of symbols; and a symbol decision unit deciding a transmitted symbol corresponding to the received pair of symbols according to the sign value of the transformed symbol pair.

According to another aspect of the present invention, there is provided a symbol decision method of an M-PSK system, the method including: performing linear transform, to which a phase error is applied, of a received pair of symbols; and deciding a transmitted symbol corresponding to the received pair of symbols according to the sign value of the transformed symbol pair.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Unlike the conventional method in which the reception performance of a system is improved through improvement of a phase-locked loop, the present invention estimates a phase error of a phase-locked loop by using sampled values of an I-channel and a Q-channel, and provides a new decision area of transmitted symbols based on the estimation, such that the symbol error rate of the M-PSK system is lowered. More specifically, a detection area for phase error estimation is generated and a phase error is estimated using sampled values of I and Q channels belonging to this area and a tangent inverse function determined in the present invention. Then, by using the estimated phase error, a new symbol decision variable is determined and the variable is used to decide transmitted symbols.

Figure 1:
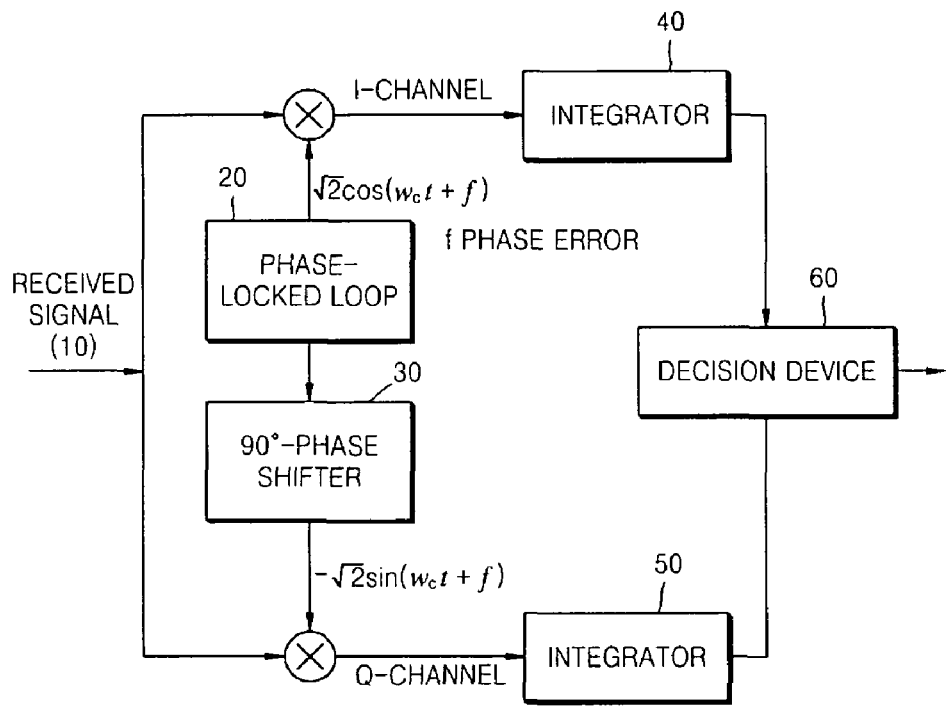
FIG. 1 illustrates a reception unit of a conventional M-PSK system.

FIG. 1 illustrates a reception unit of a conventional M-PSK system.

In the I-channel of a reception unit, a received signal 10 is multiplied by a signal, $\sqrt{2}\cos(w_c t+f)$, generated in a phase-locked loop 20. The multiplied signal is integrated through an integrator 40 and then, is input to a decision device 60.

In the Q-channel of the reception unit, the phase of an output signal of the phase-locked loop is shifted by 90 degrees by a 90-degree phase shifter 30. The resultant signal of the phase shift becomes in the form of $-\sqrt{2}\sin(w_c t+f)$. This phase shifted signal is multiplied by the received signal and is input to the decision device 60 through an integrator 50.

The decision device 60 compares the two integrated values of the I- and Q-channels with an area of symbols, that is, decides a received symbol with respect to the symbol decision area.

In the present invention, when demodulation is performed, by using phase information of sampled symbol values used in a process of deciding a symbol, a new decision area for determining transmitted symbols is provided so that the symbol error rate of an M-PSK system having a phase error can be decreased. Here, referring to FIG. 1, an example of sampled symbol values is an input signal to the decision device 60, but the values are not limited to this. Also, sampled symbol values comprise a signal provided through the I-channel and a signal provided through the Q-channel, that is, a pair of symbols.

More specifically, by using an estimated phase error and a first received symbol, a decision variable to decide a transmitted symbol in relation to the first received symbol is calculated. According the value of the sign of the calculated decision variable, a transmitted symbol is determined. Meanwhile, like the first received symbol, a second received symbol used in estimation of a phase error is one of the sampled symbols. The sampled symbol values, i.e., the input signals of the decision device 60 may be used repeatedly as both the first received symbol and the second received symbol, or may be used without duplication. Thus, the relations between the input signals of the decision device 60 and the first and second received symbols may be implemented in a variety of ways. For convenience of explanation, however, in the present invention, it is assumed that the initial samples of an input signal of the decision device 60 are used as second received symbols for estimating a phase error and the remaining samples after that are used for deciding actual transmitted symbols.

Figure 2:
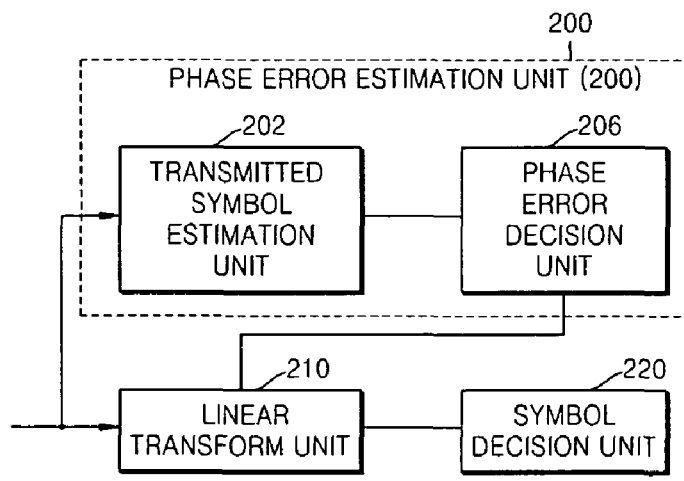
FIG. 2 is a block diagram illustrating a structure of an apparatus for deciding symbols in an M-PSK system according to an embodiment of the present invention.

FIG. 2 is a block diagram illustrating a structure of an apparatus for deciding symbols in an M-PSK system according to an embodiment of the present invention. The apparatus is composed a phase error estimation unit 200, a linear transform unit 210 and a symbol decision unit 220.

If a phase error is already obtained, the phase error estimation unit 200 can be omitted in the present embodiment. Assuming that a phase error value is not obtained yet, i.e., that estimation of a phase error is needed, the present embodiment will now be explained.

The phase error estimation unit 200 estimates a phase error occurring as described above with reference to FIG. 1. According to an estimation of the present invention, the phase error is estimated using the mean value of received symbol pairs estimated as predetermined transmitted symbols in at least one pair of second received symbols. Here, any symbols of M-PSK symbols can be selected as the predetermined transmitted symbols. That is, a pair of received symbols corresponding to a transmitted symbol having value m selected among 1, . . . , M is estimated and the mean value of the received symbol pair is used. Meanwhile, the reception apparatus of the M-PSK system has a quadrature error. Here, the quadrature error is a phase shift causing the phase difference of the I-channel signal and the Q-channel signal of the reception apparatus to exceed 90 degrees. The bigger the quadrature error is, the worse the symbol error rate performance of the M-PSK system becomes. The quadrature error does not occur in relation to a transmitted symbol having only a quadrature component. Accordingly, though estimation of a phase error can be performed by selecting only one transmitted symbol among 1, . . . , M, the phase error estimation unit 200 may estimate a transmitted symbol that does not cause a quadrature error so that degradation of a phase error estimation performance due to a quadrature error can be prevented and the accuracy of estimation of a phase error can be improved. This transmitted symbol is the transmitted symbol having only a quadrature component.

The phase error estimation unit 200 may be composed of a transmitted symbol estimation unit 202 and a phase error decision unit 206. The transmitted symbol estimation unit 202 estimates a pair of received symbols corresponding to a transmitted symbol having an arbitrary m value among 1, . . . , M. In order not to be affected by a quadrature error, a pair of received symbols corresponding to a transmitted symbol having only a quadrature component may be estimated. That is, the transmitted symbol estimation unit 202 estimates a pair of received symbols corresponding to a transmitted symbol having only a quadrature component in at least one pair of second received symbols. Here, the transmitted symbol having only a quadrature component is a signal transmitted with phase values of 0 degree and 270 degrees by a transmission end. In an example of the method of estimating a pair of received symbols corresponding to a transmitted symbol having only a quadrature component, if a transmission end transmits N symbols for transmission each having only a quadrature component as training signals, a reception end decides these N received symbols as pairs of received symbols corresponding to the transmitted symbols each having only a quadrature component and uses the symbols. Also, an estimating method according to an embodiment of the present invention to be explained later may be used. For convenience of explanation of an estimating method according to the present invention, it is assumed that a transmitted symbol having a 90-degree phase is estimated.

The transmitted symbol estimation unit 202 transforms a pair of second received symbols $(X_n, Y_n)$ into symbols Y1 and Y2 second received symbols according to the following equation 1. If the transformed symbols (Y1, Y2) of the pair are a positive number and a negative number, respectively, the pair of the second received symbols $(X_n, Y_n)$ is estimated as a pair of received symbols corresponding to a transmitted symbol having only a quadrature component. Here, M is the level of modulation of the PSK system.

$$\begin{bmatrix} Y1 \\ Y2 \end{bmatrix} = \begin{bmatrix} -\sin\left(\frac{\pi}{2} - \frac{\pi}{M}\right) & \cos\left(\frac{\pi}{2} - \frac{\pi}{M}\right) \\ -\sin\left(\frac{\pi}{2} + \frac{\pi}{M}\right) & \cos\left(\frac{\pi}{2} + \frac{\pi}{M}\right) \end{bmatrix} \begin{bmatrix} X_n \\ Y_n \end{bmatrix} \quad (1)$$

That is, the transmitted symbol estimation unit 202 decides a pair of second received symbols $(X_n, Y_n)$ satisfying Y1>0 and Y2<0, as a pair of received symbols corresponding to a transmitted symbol having a 90-degree phase component, i.e., an estimated pair of symbols, and provides the pair to the phase error decision unit 206.

The phase error decision unit 206 decides an angle between the mean value of in-phase symbols and the mean value of quadrature symbols of the estimated symbol pair, as a phase error. Also assuming that a transmitted symbol having a 90-degree phase is estimated, an operation of the phase error decision unit 206 will now be explained. The phase error decision unit estimates the phase error $\psi$ according to the following equation 2:

$$\Psi = \frac{\pi}{2}(1 - \operatorname{sgn} \overline{X}_N) + \operatorname{sgn} \overline{X}_N \tan^{-1}\left(\frac{\overline{Y}_N}{\overline{X}_N}\right) \quad (2)$$

where sgn(x) is a function that is −1 if x is a negative number and is 1 if x is equal to or greater than 0. Also, $\overline{X}_N$ and $\overline{Y}_N$ are the mean value of the in-phase symbols and the mean value of the quadrature symbols, respectively, of the N symbol pairs $(X_n, Y_n)$ estimated in the transmitted symbol estimation unit 202. Here, N is an arbitrary natural number and the bigger N is, the higher the accuracy of the estimation becomes.

The linear transform unit 210 applies linear transform to which a phase error is applied, to a pair of first received symbols $(X_n, Y_n)$, and generates new decision variables $(U_i, V_i)$. An example of the linear transform method to which the phase error is applied is the following equation 3:

$$\begin{bmatrix} U_i \\ V_i \end{bmatrix} = \begin{bmatrix} -\sin\left(\frac{\pi(2i-3)}{M} + \Psi\right) & \cos\left(\frac{\pi(2i-3)}{M} + \Psi\right) \\ -\sin\left(\frac{\pi(2i-1)}{M} + \Psi\right) & \cos\left(\frac{\pi(2i-1)}{M} + \Psi\right) \end{bmatrix} \begin{bmatrix} X_n \\ Y_n \end{bmatrix} \quad (3)$$

where i is a transmitted symbol index having a value among 1, . . . , M, M is the level of modulation of the PSK system, and $\psi$ is the estimated phase error.

The symbol decision unit 220 decides a transmitted symbol corresponding to the pair of the first received symbols according to the sign values of the decision variables $(U_i, V_i)$ that are the transformed symbol pair. More specifically, the decision variable $(U_i, V_i)$ obtained according to equation 3 are a positive number and a negative number, respectively, an i-th transmitted symbol is decided.

Figure 3:
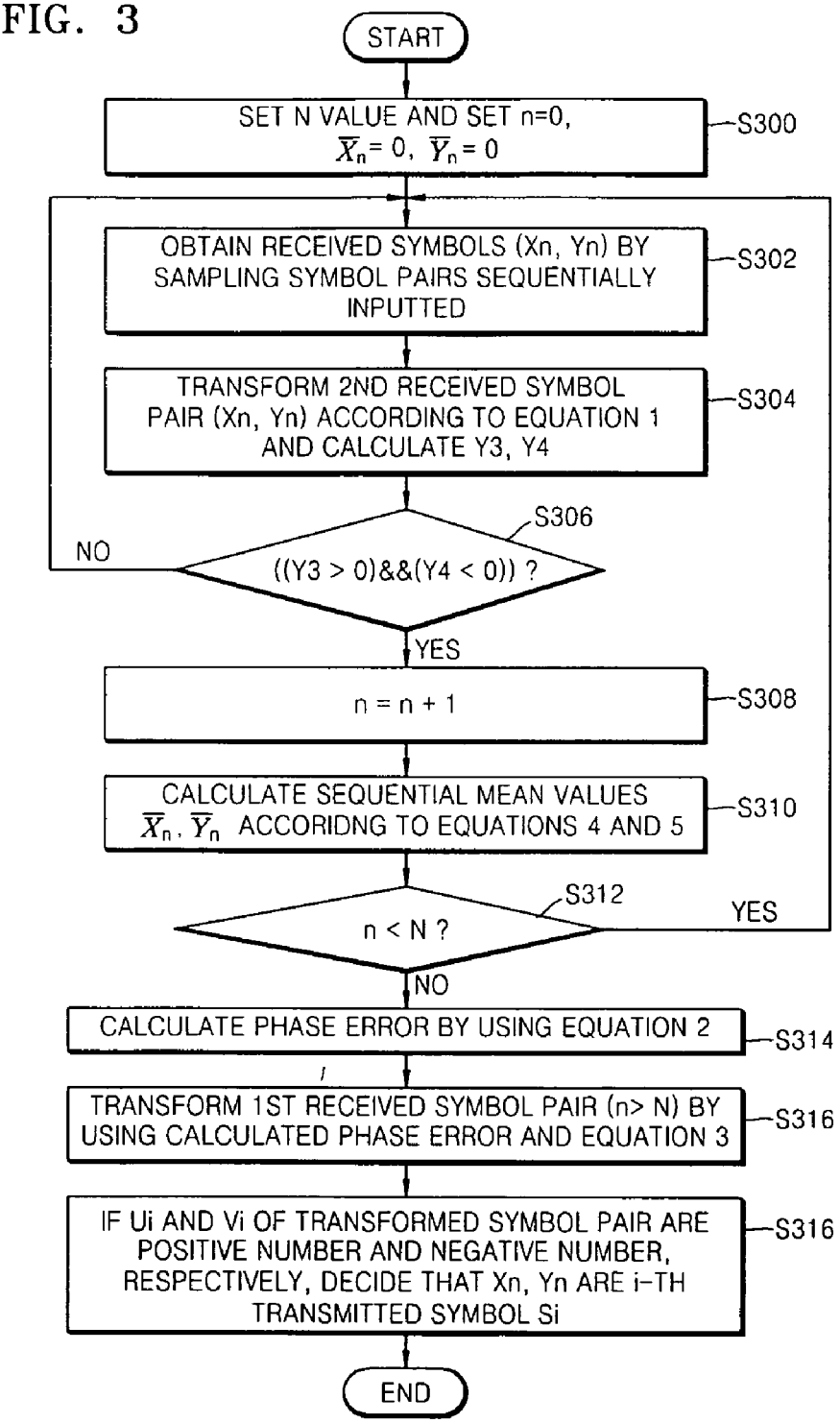
FIG. 3 is a flowchart illustrating a method of deciding symbols for a symbol deciding apparatus in an M-PSK system according to an embodiment of the present invention.

FIG. 3 is a flowchart illustrating a method of deciding symbols for a symbol deciding apparatus in an M-PSK system according to an embodiment of the present invention.

Referring to FIG. 3, the method includes phase error estimation by a phase error estimation unit 200 in operations S300 through S314, symbol transform by a linear transform unit 210 in operation 316, and symbol decision by a symbol decision unit 220 in operation S318.

First, the index n and values of variables $\overline{X}_N$ and $\overline{Y}_N$ of samples that are the input of the decision device 60 of FIG. 1, i.e., a pair of received symbols, are initialized at 0, and the number N of samples to be used in estimation of a phase error is set to an appropriate natural number value in operation S300.

Samples (Xn, Yn) composed of input values of the I-channel and the Q-channel input to the decision device 60 are determined as a pair of second received symbols for estimation of a phase error in operation S302.

The pair of the second received symbols (Xn, Yn) are transformed by the transmitted symbol estimation unit 202 according to equation 1 and as a result, Y1 and Y2 are calculated in operation S304. Next, the transmitted symbol estimation unit 202 decides whether Y1 and Y2 are negative or positive numbers in operation S306. If Y1>0 and Y2<0, the transmitted symbol estimation unit 202 increases value n, and provides a pair of second received symbols (Xn, Yn) satisfying that Y1>0 and Y2<0, to the phase error decision unit 206 in operation S308. If the condition is not satisfied in operation S306, operation S302 is performed again to obtain next new samples. After operation S308, the pair of the second received symbols (Xn, Yn) provided by the transmitted symbol estimation unit 202 are used to update the mean values $\overline{X}_N$ and $\overline{Y}_N$ according to the following equations 4 and 5 by the phase error decision unit 206 in operation S310:

$$\overline{X}_n = \frac{n-1}{n}\overline{X}_{n-1} + \frac{X_n}{n} \quad (4)$$

$$\overline{Y}_n = \frac{n-1}{n}\overline{Y}_{n-1} + \frac{Y_n}{n} \quad (5)$$

Then, the phase error decision unit determines whether n<N in operation S312. That is, whether or not the number N of samples is enough to calculate a phase error is determined. If n is less than N in operation S312, operation S302 is performed again to obtain next new samples, and if n is equal to or greater than N in operation S312, a phase error is calculated by the phase error decision unit 206 according to equation 2 in operation S314.

A pair of first received symbols is transformed by the linear transform unit 210 by using the phase error ψ calculated in operation S314 and equation 3, and as a result, new decision variables Ui and Vi are generated in operation S316.

Next, a value i which makes the transformed resultant values Ui and Vi a positive number and a negative number, respectively, is obtained by the symbol decision unit 220 and the obtained value i is decided as a transmitted symbol value corresponding to the pair of the first received symbols in operation S318.

Figure 4:
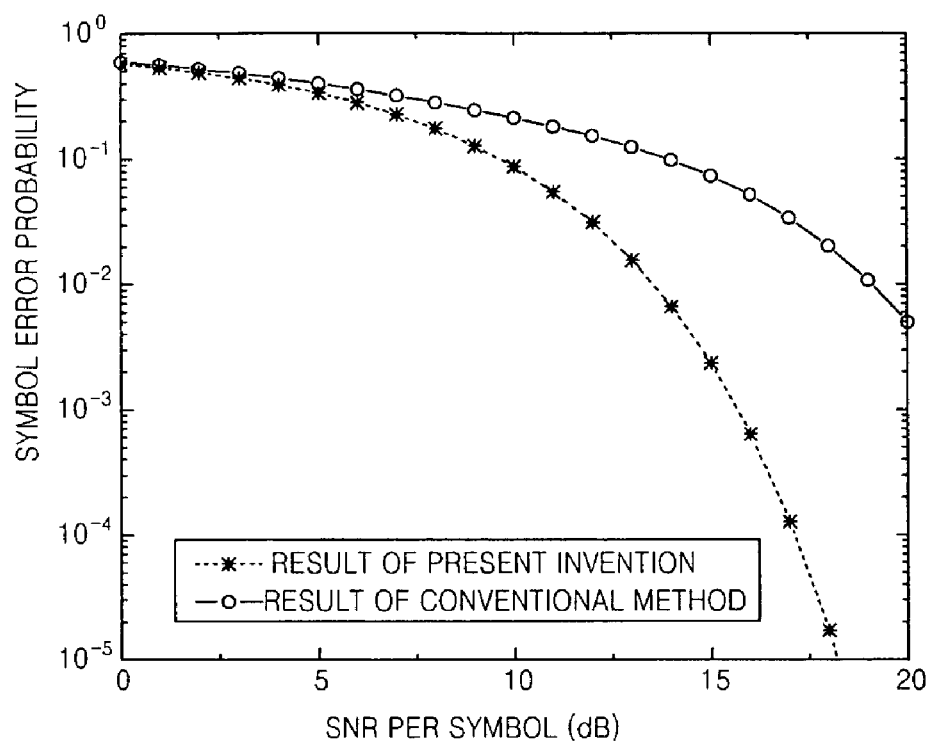
FIG. 4 illustrates performance curves showing symbol error rate performances of the conventional method and an embodiment of the present invention with respect to an 8-PSK system of a Gaussian channel.

FIG. 4 illustrates performance curves showing symbol error rate performances of the conventional method and an embodiment of the present invention with respect to an 8-PSK system of a Gaussian channel.

The vertical axis indicates a symbol error rate and the horizontal axis indicates a signal-to-noise ratio (SNR) per symbol in dB.

Referring to FIG. 4, it can be seen that in the region of a symbol error rate $10^{-2}$, the decision method according to an embodiment of the present invention is much better than the conventional decision method that does not consider a phase error.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, the symbol error rate of an M-PSK system having a phase error can be lowered. More specifically, in an 8-PSK system having a phase error of π/15 in a Gaussian channel environment, an improvement of a SNR by 4 dB in a symbol error rate region of $10^{-2}$ can be achieved. Also, according to the present invention a phase error can be estimated through a simple process of linear transform.

What is claimed is:

1. A symbol decision apparatus of a M-ary phase shift keying (M-PSK) system, the apparatus comprising:
   a linear transform unit performing linear transform, to which a phase error is applied, of a received pair of symbols, wherein the linear transform unit transforms the pair of received symbols (Xn,Yn) according to the following equation:

$$\begin{bmatrix} U_i \\ V_i \end{bmatrix} = \begin{bmatrix} -\sin\left(\frac{\pi(2i-3)}{M} + \Psi\right) & \cos\left(\frac{\pi(2i-3)}{M} + \Psi\right) \\ -\sin\left(\frac{\pi(2i-1)}{M} + \Psi\right) & \cos\left(\frac{\pi(2i-1)}{M} + \Psi\right) \end{bmatrix} \begin{bmatrix} X_n \\ Y_n \end{bmatrix}$$

where i is a transmitted symbol index having a value among 1, . . . , M, M is the level of modulation of the PSK system, and ψ is the estimated phase error; and
   a symbol decision unit deciding a transmitted symbol corresponding to the received pair of symbols according to the sign value of the transformed symbol pair, wherein the symbol decision unit decides an i-th transmitted symbol if the transformed symbols (Ui,Vi) of the pair are a positive number and a negative number, respectively.

2. The apparatus of claim 1, further comprising a phase error estimation unit estimating the phase error by using the mean value of a pair of received symbols estimated as a predetermined transmitted symbol in at least one pair of the received symbols, and providing the estimated phase error to the linear transform unit.

3. The apparatus of claim 2, wherein the phase error estimation unit comprises:
- a transmitted symbol estimation unit estimating a pair of received symbols corresponding to a transmitted symbol having only a quadrature component in the at least one pair of received symbols; and
- a phase error decision unit deciding an angle between the mean value of in-phase symbols and the mean value of quadrature symbols of the estimated symbol pair, as the phase error.

4. The apparatus of claim 3, wherein the transmitted symbol estimation unit transforms the pair of received symbols (Xn,Yn) according to the following equation:

$$\begin{bmatrix} Y1 \\ Y2 \end{bmatrix} = \begin{bmatrix} -\sin\left(\frac{\pi}{2} - \frac{\pi}{M}\right) & \cos\left(\frac{\pi}{2} - \frac{\pi}{M}\right) \\ -\sin\left(\frac{\pi}{2} + \frac{\pi}{M}\right) & \cos\left(\frac{\pi}{2} + \frac{\pi}{M}\right) \end{bmatrix} \begin{bmatrix} X_n \\ Y_n \end{bmatrix}$$

where M is the level of modulation of the PSK system, and if the transformed symbols (Y1,Y2) of the pair are a positive number and a negative number, respectively, the transmitted symbol estimation unit estimates the pair of the received symbols (Xn,Yn) as a pair of received symbols corresponding to a transmitted symbol having only the quadrature component, and
the phase error decision unit estimates the phase error $\psi$ according to the following equation:

$$\Psi = \frac{\pi}{2}(1 - \operatorname{sgn} \overline{X}_N) - \operatorname{sgn} \overline{X}_N \tan^{-1}\left(\frac{\overline{Y}_N}{\overline{X}_N}\right)$$

where sgn(x) is a function that is −1 if x is a negative number and is 1 if x is equal to or greater than 0, and $\overline{X}_N$ and $\overline{Y}_N$ are the mean values, respectively, of the estimated N pairs of symbols (Xn,Yn).

5. A symbol decision method of an M-PSK system, the method comprising:
- performing linear transform, to which a phase error is applied, of a received pair of symbols, wherein in the performing of the linear transform the pair of received symbols (Xn,Yn) is transformed according to the following equation:

$$\begin{bmatrix} U_i \\ V_i \end{bmatrix} = \begin{bmatrix} -\sin\left(\frac{\pi(2i-3)}{M} + \Psi\right) & \cos\left(\frac{\pi(2i-3)}{M} + \Psi\right) \\ -\sin\left(\frac{\pi(2i-1)}{M} + \Psi\right) & \cos\left(\frac{\pi(2i-1)}{M} + \Psi\right) \end{bmatrix} \begin{bmatrix} X_n \\ Y_n \end{bmatrix}$$

where i is a transmitted symbol index having a value among 1, ..., M, M is the level of modulation of the PSK system, and $\psi$ is the estimated phase error; and
- deciding a transmitted symbol corresponding to the received pair of symbols according to the sign value of the transformed symbol pair wherein in the deciding of the transmitted symbol an i-th transmitted symbol is decided if the transformed symbols (Ui,Vi) of the pair are a positive number and a negative number, respectively.

6. The method of claim 5, further comprising estimating the phase error by using the mean value of a pair of received symbols estimated as a predetermined transmitted symbol in at least one pair of the received symbols.

7. The method of claim 6, wherein the estimating of the phase error comprises:
- estimating a pair of received symbols corresponding to a transmitted symbol having only a quadrature component in the at least one pair of received symbols; and
- deciding an angle between the mean value of in-phase symbols and the mean value of quadrature symbols of the estimated symbol pair, as the phase error.

8. The method of claim 3, wherein in the estimating of the pair of the received symbols the pair of received symbols (Xn,Yn) are transformed according to the following equation:

$$\begin{bmatrix} Y1 \\ Y2 \end{bmatrix} = \begin{bmatrix} -\sin\left(\frac{\pi}{2} - \frac{\pi}{M}\right) & \cos\left(\frac{\pi}{2} - \frac{\pi}{M}\right) \\ -\sin\left(\frac{\pi}{2} + \frac{\pi}{M}\right) & \cos\left(\frac{\pi}{2} + \frac{\pi}{M}\right) \end{bmatrix} \begin{bmatrix} X_n \\ Y_n \end{bmatrix}$$

where M is the level of modulation of the PSK system, and if the transformed symbols (Y1,Y2) of the pair are a positive number and a negative number, respectively, the pair of the received symbols (Xn,Yn) is estimated as a pair of received symbols corresponding to a transmitted symbol having only the quadrature component, and
in the deciding of the angle, the phase error $\psi$ is estimated according to the following equation:

$$\Psi = \frac{\pi}{2}(1 - \operatorname{sgn} \overline{X}_N) + \operatorname{sgn} \overline{X}_N \tan^{-1}\left(\frac{\overline{Y}_N}{\overline{X}_N}\right)$$

where sgn(x) is a function that is −1 if x is a negative number and is 1 if x is equal to or greater than 0, and $\overline{X}_N$ and $\overline{Y}_N$ are the mean values, respectively, of the estimated N pairs of symbols (Xn,Yn).

* * * * *